United States Patent [19]

Fast

[11] Patent Number: 4,911,392
[45] Date of Patent: Mar. 27, 1990

[54] STRIP MECHANDISER WITH REINFORCEMENT SECTION

[76] Inventor: Jacob Fast, 7561 NW. 9th St., Plantation, Fla. 33317

[21] Appl. No.: 311,818

[22] Filed: Feb. 16, 1989

[51] Int. Cl.[4] .............................................. F16B 5/06
[52] U.S. Cl. ............................. 248/220.3; 248/223.4; 248/304; 40/124; 40/657; 211/113
[58] Field of Search .................. 248/205.3, 215, 220.3, 248/220.4, 221.4, 223.3, 224.4, 225.2, 304; 211/57.1, 59.1, 113; 40/124, 657

[56] References Cited

U.S. PATENT DOCUMENTS

| | | | |
|---|---|---|---|
| 4,005,942 | 2/1977 | Gilb | 248/903 |
| 4,179,138 | 12/1979 | Bogdanovic | 248/223.4 |
| 4,420,082 | 12/1983 | Bernie | 248/205.3 |
| 4,483,502 | 11/1984 | Fast | 248/220.2 |
| 4,541,598 | 9/1985 | Villanueva | 248/221.4 |
| 4,546,943 | 10/1985 | Fast | 248/205.3 |
| 4,572,380 | 2/1986 | Langwell | 211/57.1 |
| 4,713,899 | 12/1987 | Fast | 211/57.1 |
| 4,718,627 | 1/1988 | Fast | 248/223.4 |

FOREIGN PATENT DOCUMENTS 941624 11/1963 United Kingdom .................. 40/124

Primary Examiner—Ramon O. Ramirez
Assistant Examiner—Robert A. Olson
Attorney, Agent, or Firm—Fleit, Jacobson, Cohn, Price, Holman & Stern

[57] ABSTRACT

A strip merchandiser of plastic sheet for hanging from the front edge of a display shelf has a cutout defining an upwardly pointing hook to suspend products from the strip. In order to reinforce the hook and enable more than one product to be suspended therefrom, the hook and reinforcement section of the strip below the hook are folded back about the longitudinal center line of the strip. Opposite sides of the reinforcement section are secured together behind the strip.

19 Claims, 2 Drawing Sheets

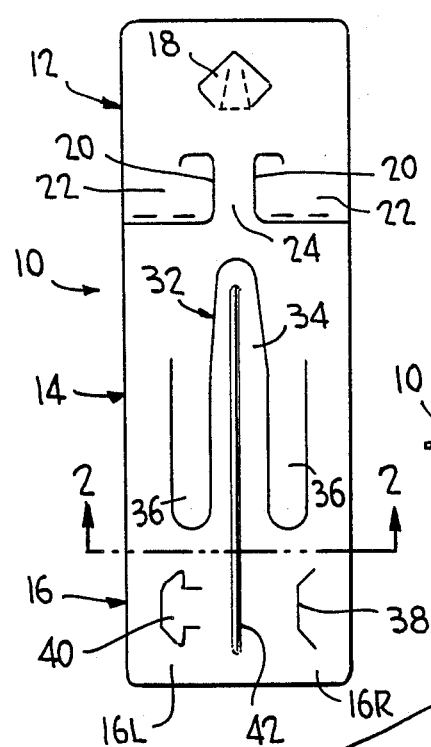
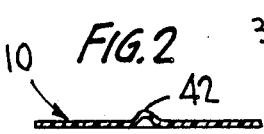
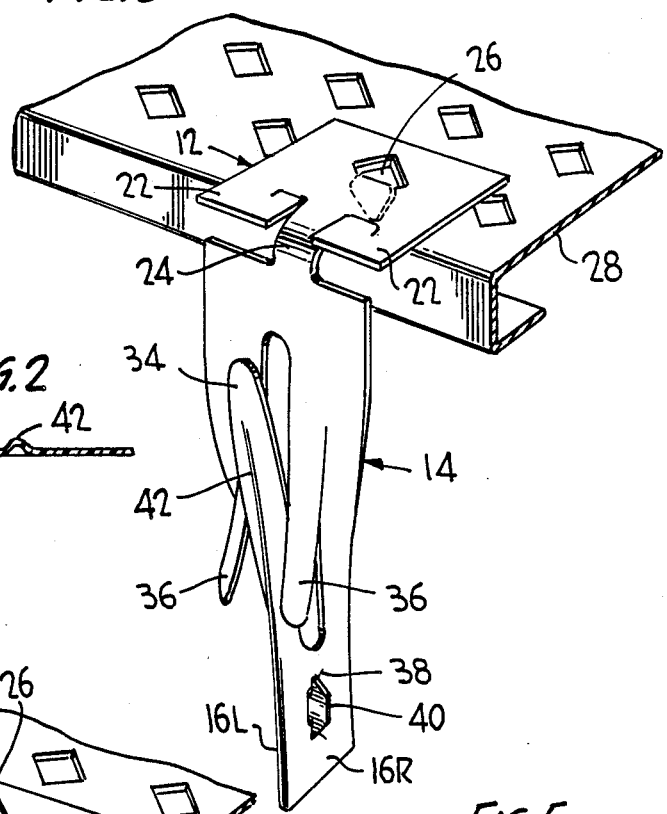
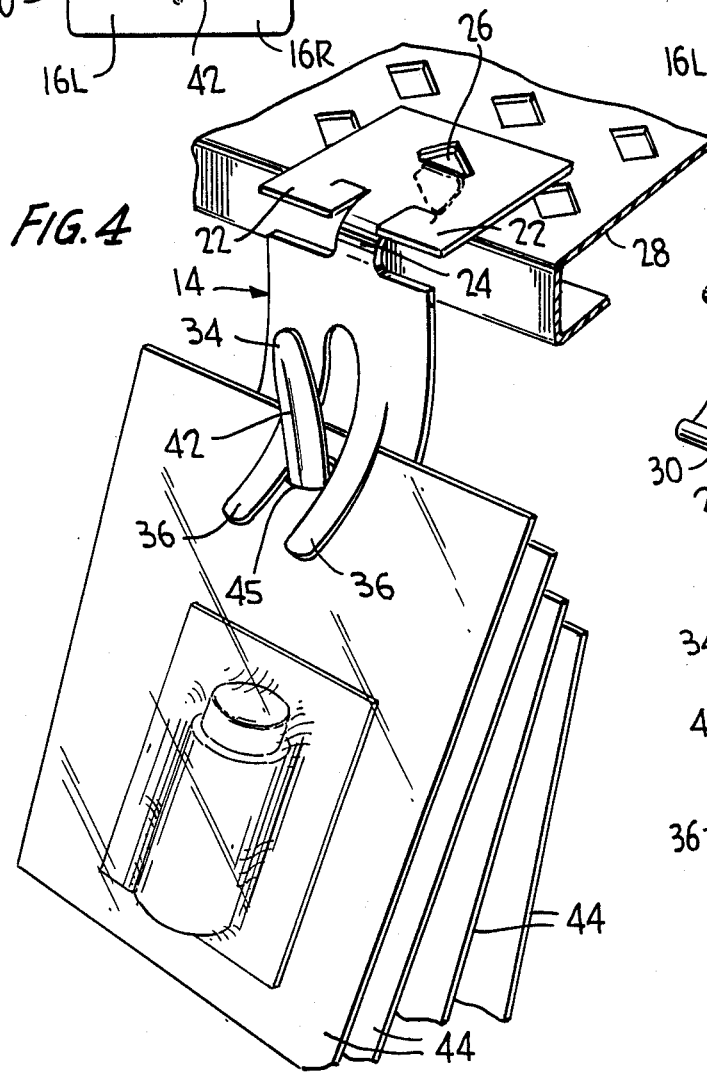
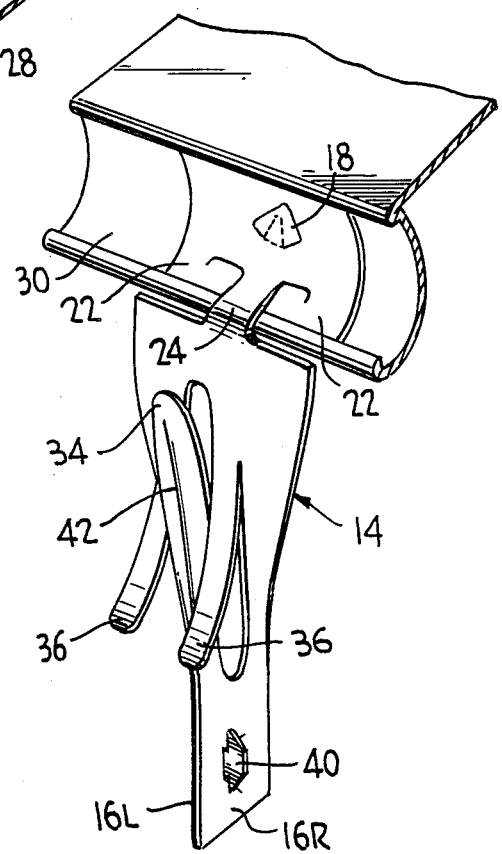

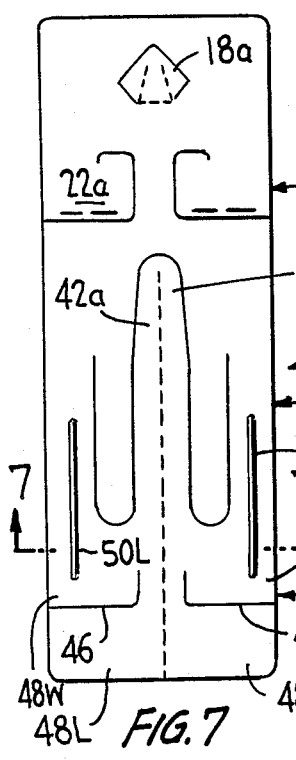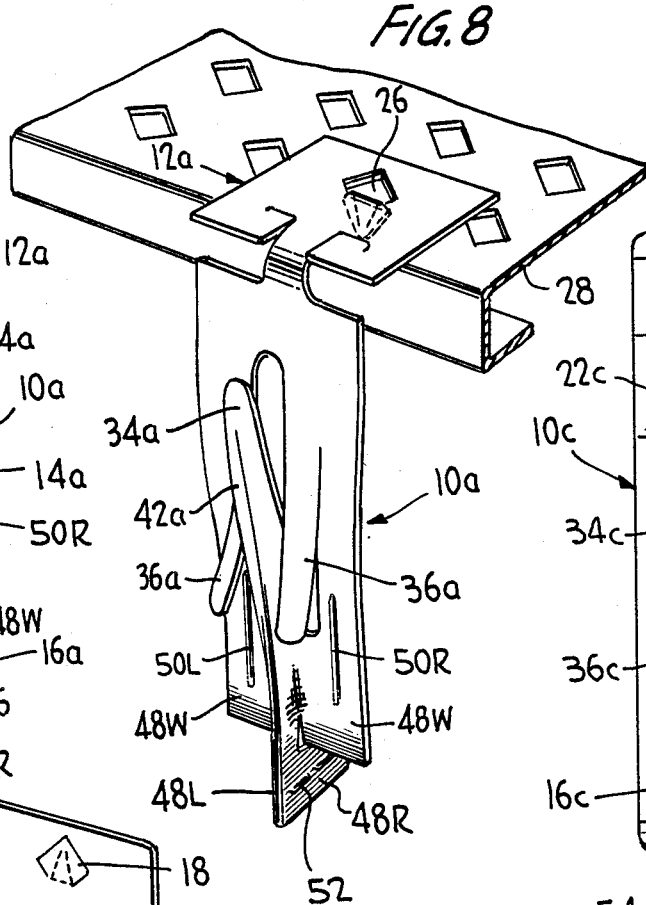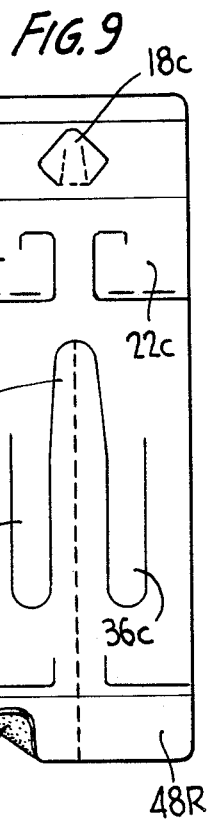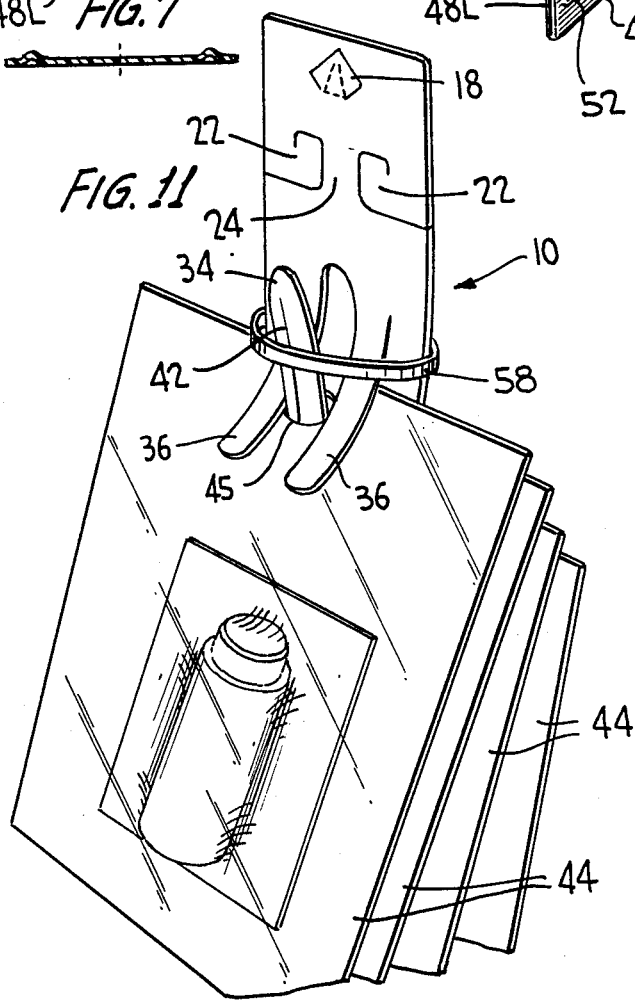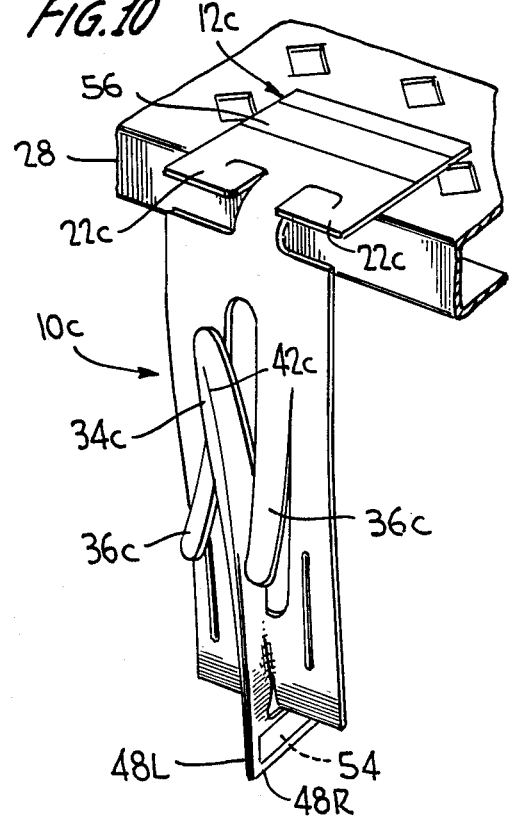

STRIP MECHANDISER WITH REINFORCEMENT SECTION

BACKGROUND OF THE INVENTION

This invention relates to a strip merchandiser generally of the type disclosed, for example, in prior U.S. Pat. Nos. 4,483,502; 4,546,943 and 4,718,627. The disclosures of these patents are expressly incorporated herein by reference.

Each of the above patents discloses a merchandise display element in the form of an elongate plastic strip (i.e., a strip merchandiser) which, in use, is suspended from the front edge of a merchandise display shelf or the like to itself suspend apertured products, such as blister packs, for display. Commonly, the strips have a series of superimposed cutouts or the like which form integral upwardly facing individual support hooks for the products.

One particularly advantageous use for a strip merchandiser of the above type is as a replacement for a product display hook, commonly referred to as a J-hook, which essentially is a wire hook extending forwardly from a shelf and from which a group of products can be suspended. J-hooks, due to their protrusion in front of a shelf, may tend to snag on customers' clothing or even result in injury if accidentally encountered by a customer. Strip merchandisers on the other hand hang substantially flush at the front of a shelf and do not therefore have such problems to the same degree as a J-hook. However, due to the flexible nature of the support hooks in a strip merchandiser, it is not generally possible to suspend a significant number of products from a single hook, as with the more rigid wire J-hook, and accordingly strip merchandisers usually need a number of superimposed hooks to accommodate the same number of products as a single J-hook. This uses up plastic material and takes up space below a shelf from which the merchandiser is suspended.

OBJECTS OF THE INVENTION

It is an object of the invention to provide a strip merchandiser of the kind described wherein an individual support hook can be made to accommodate a larger number of suspended products than in known forms of strip merchandiser.

Another object of the invention is to provide a compact, inexpensive, single-hook strip merchandiser wherein the hook has sufficient strength to accommodate a number of suspended products so as to provide a viable replacement for a J-hook substantially without its disadvantages.

Still another object of the invention is to provide a strip merchandiser having means for effectively reinforcing a suspension hook to enable a number of products, such as blister packs, to be suspended from the hook.

Yet another object of the invention is to provide a package comprising a strip merchandiser and a plurality of packaged products pre-assembled on a support hook element of the merchandiser ready for display by a store keeper.

SUMMARY OF THE INVENTION

In accordance with the invention, a strip merchandiser is provided with a reinforcement section below the cutout which defines a suspension hook, which section, along with at least a part of a tongue which defines the hook, can be folded substantially along a vertical center line of the strip so that opposite sides of said section can be secured together behind the strip effectively to reinforce the hook.

Preferably, the strip may be formed with a fold line extending along the vertical center line of the strip across at least parts of the reinforcement section and the tongue so as to promote folding of the strip in the required manner. The reinforcement section may itself be provided with attachment means (such as a slit on one side and an arrow head on the other side, or an adhesive) for securing the opposite sides together, or alternatively outside means such as a staple or other mechanical fastener may be used.

The folded strip provides effective reinforcement of the hook and allows more products to be suspended therefrom. Also, the hook projects upwardly rather than forwardly and can flex, therefore having less tendency to injure customers than does a J-hook.

BRIEF DESCRIPTION OF THE DRAWINGS

FIG. 1 is an elevational view of a first embodiment strip merchandiser according to the invention;

FIG. 2 is a sectional view on line 2—2 of FIG. 1;

FIG. 3 is a perspective view of the strip merchandiser suspended from a shelf;

FIG. 4 is a somewhat enlarged view similar to FIG. 3 showing blister packs suspended from the strip merchandiser;

FIG. 5 is perspective view of the strip merchandiser suspended from a shelf having a price channel;

FIG. 6 is an elevational view of a second embodiment strip merchandiser according to the invention;

FIG. 7 is a sectional view on lines 7—7 of FIG. 6;

FIG. 8 is a view similar to FIG. 3 with the second embodiment strip merchandiser;

FIG. 9 is an elevational view of a third embodiment strip merchandiser;

FIG. 10 is a perspective view of a fourth embodiment strip merchandiser suspended from a shelf; and FIG. 11 is a perspective view of a pre-assembled package of products and a strip merchandiser according to the previous embodiments.

DESCRIPTION OF THE PREFERRED EMBODIMENTS

Referring initially to FIG. 1, there is shown a generally rectangular elongate strip merchandiser 10, which may be die-cut or the like, in known manner, from plastic sheet, and which includes an upper end mounting section or panel 12, a central body section or panel 14, and a lower end reinforcement section or panel 16.

Mounting section 12 of the strip is substantially alike to the equivalent universal mounting section disclosed in the aforesaid U.S. Pat. No. 4,718,627 insofar as it has both a depressable foldable arrowhead formation 18 as well as slits 20 defining tabs 22 and a central neck 24. The arrowhead can be pressed into an aperture 26 in a shelf 28 (FIGS. 3 and 4) providing one form of mounting for the strip, while the tabs 22 and neck 24 allow the strip to be secured in a price channel 30 as shown in FIG. 5.

Body section 14 of strip 10 is provided with an elongated generally W-shaped slit 32 defining a tongue-like upwardly pointing central support hook formation 34, and a pair of straddling downwardly pointing tongues 36. When suspended from a shelf as shown in FIGS. 3 to 5, tongue 34 provides an upwardly pointing hook for suspending merchandise, and tongues 36 provide stabilizers which flap over the front of the merchandise, as shown in FIG. 4, to stabilize same on hook 34.

Reverting to FIG. 1, it will seen that the lower end reinforcement section 16 of strip 10 has on its right side a dish-shaped slit 38 and on its left side a complementary cutout arrowhead 40. Further, the strip has a fold line or crease means 42 extending along the central longitudinal axis of the strip across a major part of section 16 of the strip, into and along a major part of the length of hook 34.

Provision of the fold line 42 promotes folding of the strip along its vertical center line, so that the opposite sides 16L and 16R of section 16 can be brought towards one another and secured together behind the strip 10, by inserting arrow head 40 in slit 38, as shown in FIGS. 3 and 5. The securing together of side 16L and 16R of section 16 and the folding of hook 34 along line 42 provides effective reinforcement of the hook and resistance to bending, so that a number of blister packs 44 (e.g. four such packs as shown in FIG. 4) can be suspended from the hook, thereby increasing its load capacity compared with an unreinforced hook. Where the blister packs have a round suspension hole 45 of standard ¼" diameter, the hook 34 preferably is of such width as to fit in the hole only when it is folded about line 42. Also, the provision of the attachment means 40, 38 which holds the sides of section 16 together, serves to retain hook 34 in its narrower state, so that the packs 44 will not jam when removed from the hook.

The second embodiment strip 10a shown in FIGS. 6 to 8 is similar to strip 10 and like references with (a) suffixes are used to denote like parts. Strip 10a has modified reinforcement section 16a compared with strip 10 insofar as it has L-shaped slits 46 extending from the opposite edges which define left and right tabs 48L, 48R. The central fold line 42a in this case extends from the base of the strip substantially to the tip of hook 34a. Additionally, the strip has left and right reinforcing ribs or creases 50L, 50R impressed therein.

In the second embodiment, only the tabs 48L, 48R and the hook 34a are folded back about line 42a, and tabs 48L, 48R are secured together behind the strip, in this case, for example, by a staple 52, although other securing means could be used, such as the arrow head and slit arrangement as in the previous embodiment, heat-sealing or thermo-welding, or a contact adhesive 54 applied to the back surface of the tabs as shown in FIG. 9 (A release paper would be provided for covering the contact adhesive.) FIG. 10 shows a modification to the mounting section 12c of strip 10c where the arrowhead 18 is omitted and the strip is adhered to a shelf by a strip of adhesive 56.

It will be understood that strips 10a, 10b and 10c may be used in like manner to strip 10 with the respective hooks 34a, 34b and 34c being reinforced to enable them to accommodate a number of suspended items. Because only the tabs 48L and 48R are bent out of the plane of the strip, leaving the wings 48W on each side the hanging merchandise has a reduced tendency to twist sideways. Because of the reinforcing ribs 50L and 50R, the strips have a reduced tendency to twist lengthwise when products are suspended thereon, thereby promoting more stable retention of the products on the respective hooks. The ribs 50L and 50R tend to preclude the lower portion of the wings 48W from flexing rearwardly under the weight of suspended products.

FIG. 11 shows an arrangement in which a number of merchandise items, such as the blister packs 44 may be pre-assembled or pre-packaged on hook 34 of strip 10 for shipment and supply to a store and the like, so that a store keeper can suspend the complete package from a shelf or the like as previously described without having to individually place the packaged items on a hook. It is expedient to utilize an elastic band 58 or the like to surround and grip hook 30 and tongues 36, so as to preclude the packs 44 from becoming dislodged during shipment. Band 58 can be removed over the top of the strip prior to its ultimate use.

While only preferred embodiments of the invention have been described herein in detail, the invention is not limited thereby and modifications can be made within the scope of the attached claims.

What is claimed is:

1. A strip merchandiser comprising an elongate strip of flexible material having an upper end attachment section for suspending the strip from a shelf and the like, an intermediate body section with a cutout defining an upwardly pointing suspension hook, a lower end reinforcement section and crease means on the strip for promoting folding of the reinforcement section, along with at least a part of the hook, about a longitudinal center line of the strip so that opposite sides of the reinforcement section can be secured together behind the strip effectively to reinforce the hook and increase its resistance to bending.

2. The invention defined in claim 1 wherein said cutout is substantially W-shaped and defines a pair of downwardly pointing tongues straddling the suspension hook.

3. The invention defined in claim 1 in combination with at least one merchandise item suspended on the hook to form a package.

4. The invention defined in claim 3 including a band surrounding the strip over the hook to retain said item on the hook.

5. The invention defined in claim 4 including at least two merchandise items suspended on the hook.

6. The invention defined in claim 1 wherein the crease means extends along said center line over at least parts of the reinforcement section and the hook.

7. The invention defined in claim 6 wherein the reinforcement section includes slits extending inwardly from opposite edges of the strip, said slits defining tabs for folding back and securing behind the strip.

8. The invention defined in claim 7 wherein the strip further includes longitudinally extending reinforcing rib means in the body section of the strip.

9. The invention as defined in claim 6 wherein said opposite sides of the reinforcement section include respective securement means for securing same together behind the strip.

10. The invention defined in claim 9 wherein the securement means comprises adhesive means on a back surface of the reinforcement section.

11. The invention defined in claim 9 wherein the securement means comprises interfitting male and female formations on said respective sides.

12. The invention as defined in claim 11, wherein the male formation comprises a cutout defining an arrow head and the female formation comprises a slit for receiving the arrow head.

13. A strip merchandiser comprising an elongate strip of flexible material having an upper end attachment section for suspending the strip from a shelf and the like, an intermediate body section with a cutout defining an upwardly pointing suspension hook, and a lower end reinforcement section folded back along with at least a part of the hook about a longitudinal center line of the strip with opposite side portions of the reinforcement section being secured together behind the strip effectively to reinforce the hook and increase its resistance to bending, the merchandiser including crease means on the strip extending along said center line over at least parts of the reinforcement section and the hook.

14. The invention defined in claim 13 wherein said opposite sides of the reinforcement section are secured together by means integral with the respective sides.

15. The invention defined in claim 14 wherein said means integral comprises a female format on one of said sides and an interfitting male formation on the other of said sides.

16. The invention defined in claim 14 wherein said means integral comprises adhesive means on the respective sides.

17. The invention defined in claim 13 wherein said opposite sides are secured together by mechanical fastener means.

18. The invention defined in claim 17 wherein the mechanical fastener means comprises a staple.

19. The invention defined in claim 17 wherein the reinforcement section includes slits extending inwardly from opposite edges of the strip, said slits defining tabs which are secured together by said fastening means.

* * * * *